June 13, 1933. C. R. BAILEY 1,913,365
ANTIFRICTION BEARING
Filed Jan. 5, 1929
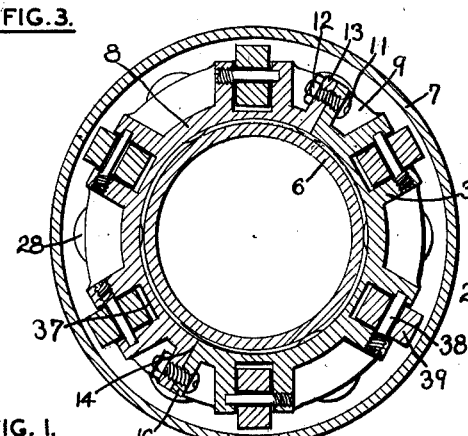
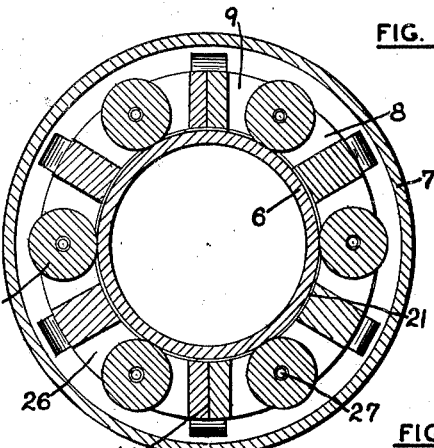
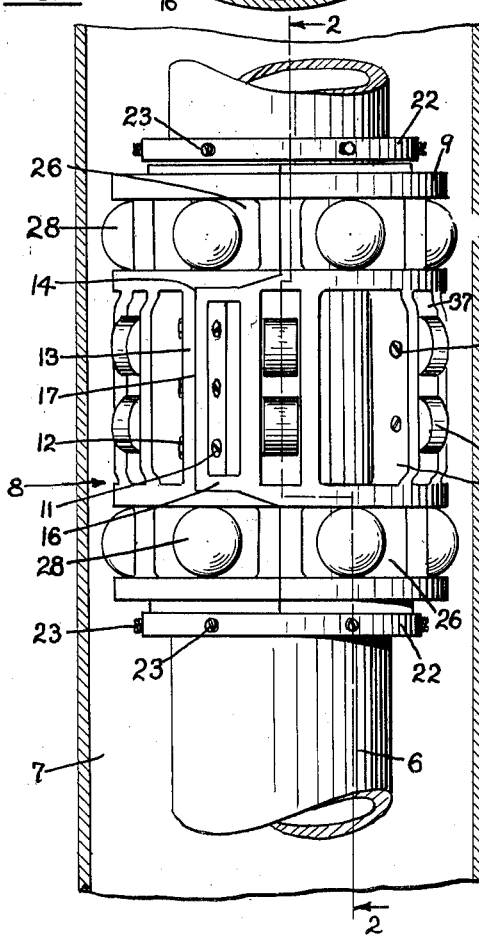
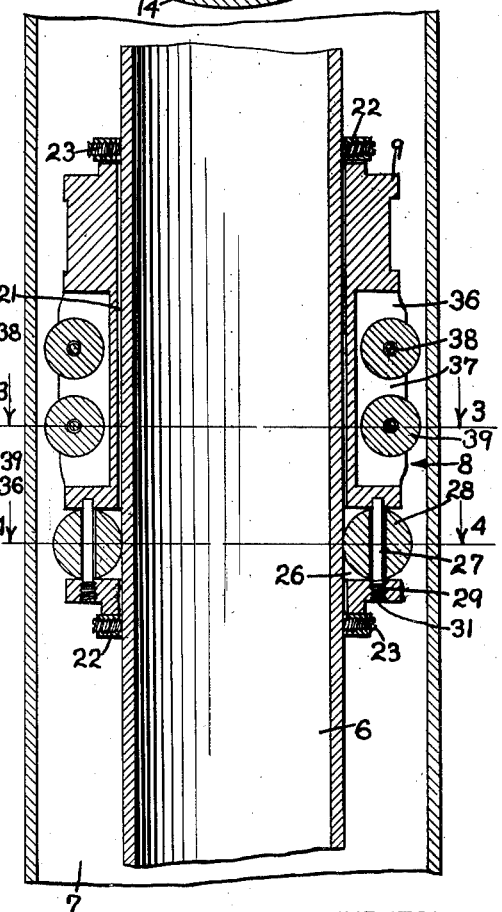
INVENTOR
C. R. BAILEY
BY Hazard and Miller
ATTORNEYS Patented June 13, 1933

1,913,365

UNITED STATES PATENT OFFICE

CLARENCE R. BAILEY, OF LOS ANGELES, CALIFORNIA, ASSIGNOR TO CAROL SUPPLIES, INC., OF LOS ANGELES, CALIFORNIA, A CORPORATION OF ARIZONA

ANTIFRICTION BEARING

Application filed January 5, 1929. Serial No. 330,495.

This invention relates to anti-friction bearings, and has for an object the provision of an anti-friction bearing adapted to be interposed between any movably mounted shaft or column, and the surrounding structure or casing within which that shaft or column is disposed.

More particularly, an object of the invention is the provision of an anti-friction bearing adapted to be interposed between a drill stem such as that commonly employed in rotary drilling, and the casing through which the drill stem extends.

A further object is the provision of an anti-friction bearing as described, comprising a jacket securable to the drill stem and having rollers interposed between the jacket and the surrounding casing.

A further object is the provision of an anti-friction bearing as described, in which the rollers are mounted for rotation about axes perpendicular to the axis of the drill stem, and in which the sleeve is mounted for rotation about the axis of the drill stem. As a result, friction between the drill stem and the casing is practically eliminated, regardless of whether the movement of the drill stem within the casing is longitudinal or rotational.

A still further object is the provision of an anti-friction bearing as described, in which rollers are also provided between the jacket and the drill stem, with a consequent further reduction in friction.

A still further object is the provision of an anti-friction bearing of the general character described, in which the jacket is formed of a plurality of separably joined arcuate sections, with the result that the jacket can be positioned upon or removed from the drill stem without the necessity of slipping the jacket over an end thereof. This feature permits installation and removal of the jacket with its associated rollers, upon a continuous drill stem without the necessity of separating sections of which the drill stem is built up.

The invention possesses other objects and advantageous features, some of which, with those enumerated, will be set forth in the following description of the invention's particular embodiment which is illustrated in the drawing accompanying and forming a part of the specification.

Referring to the drawing:

Figure 1 is a vertical sectional view taken through a section of casing to show an antifriction bearing embodying the principles of my invention in elevation and mounted in operative position upon a section of drill stem which is movably mounted within the casing.

Fig. 2 is a vertical, compound sectional view, the planes of section being indicated by the lines 2—2 of Fig. 1, and the direction of view being indicated by the arrows.

Fig. 3 is a horizontal sectional view, the plane of section being indicated by the line 3—3 of Fig. 2, with the direction of view as indicated.

Fig. 4 is a horizontal sectional view, the plane of section being taken upon the line 4—4 of Fig. 2, with the direction of view as indicated.

In rotary deep well drilling, one of the problems presented which are of a serious nature, is the tendency of the drill stem to wear through the casing through which the drill stem extends. It is readily appreciable that this tendency is considerably enhanced in cases where the hole already drilled and provided with casing, is not straight, because of the fact that the drill stem will rub against the inside of the casing wherever any bend in that casing occurs. It is also readily apparent that such wearing of the casing is very undesirable and conducive to delays in the drilling process, because when the casing is worn through, edges are presented which are apt to engage the sleeves and tool joints by means of which the component sections of the drill stem are united, tending to interfere with raising and lowering of the drill stem. Moreover, if it should so happen that the point at which the casing is worn through is in a water stratum, a laborious and expensive "cementing off" process will be necessary to stop the flow of water into the casing before the drilling process can be continued. In fact, there are many reasons for exerting effort to prevent friction between the drill stem and the casing, those cited being merely exemplary.

With these undesirable conditions in view, I have devised the anti-friction bearing of the present invention. It is herein shown and described as being mounted upon a drill stem 6, mounted for both longitudinal and rotational movement within a conventional casing 7. In its preferred form, the bearing comprises a jacket or body portion 8, built up of a plurality of arcuate sections 9, preferably two so that the jacket can be assembled upon a continuous drill stem 6 without the necessity of slipping the jacket over an end thereof. A plurality of bolts 11, having nuts 12 thereon, extend through ribs 13 on each of the sections 9, to rigidly and separably attach the sections together to present a cylindrical jacket encircling the drill stem 6. Preferably the joint 14 between the sections 9, instead of being straight, defines a tongue 16 on each of the sections 9 adapted to seat within a complementary recess 17 in the other section 9, precluding the possibility if longitudinal slippage of one section in respect to the other. The bore 21 of the jacket 8, is slightly greater in diameter than the outside diameter of the drill stem 6, so that the jacket 8 is free to rotate in respect thereto. A collar 22 is rigidly attached to the drill stem 6 at each end of the jacket 8, to restrain the jacket against movement longitudinally of the drill stem, these collars 22 being attached to the drill stem by means of a plurality of set screws 23 or their equivalent.

A plurality of recesses 26 are formed in the bore of the jacket 8, adjacent each end thereof; and each of these recesses 26 has a pin 27 extending thereacross parallel to the bore 21. A roller 28 is journalled upon each of the pins 27, and the parts are so proportioned and arranged that these rollers 28 bear against the outside of the drill stem 6 to serve as anti-friction rollers between the drill stem and the jacket 8. It should be understood that it is optional whether or not the recesses 26 extend entirely through the associated side of the jacket 8 or are merely open into the bore 21, this to be determined by the size of the rollers 28 employed. Moreover, the rollers 28 are of any suitable material such as metal or fiber, and of any suitable shape, either cylindrical or spherical, depending upon the dictates of the immediate case. The pins 27 are removable from the jacket 8, being provided with threads 29 adjacent an end of each, and a suitable kerf 31 to facilitate insertion or removal.

The jacket 8 is further provided with a plurality of longitudinally extending ribs 36, defining therebetween, recesses 37 in the outer surface of the jacket 8. One or more pins 38 extend across each of the recesses 37, these pins being removably mounted preferably in the same manner as the pins 27 previously described. A roller 39 is journalled upon each of the pins 38, these rollers extending beyond the outer surface of the jacket 8 to bear against the inside of the casing 7. It is apparent that the rollers 39 are mounted for rotation about axes perpendicular to those about which the rollers 28 rotate, so that friction between the drill stem 6 and casing 7, is practically eliminated, regardless of whether that friction results from longitudinal or rotational movement of the drill stem in respect to the casing. The rollers 39 are also formed of any suitable material and of any suitable configuration.

In operation, when the drill stem 6 is being raised or lowered within the casing 7, the rollers 39 will serve to eliminate friction therebetween, since these rollers 39 are journalled upon the jacket 8, and engage the inner circumference of the casing 7. Then, when the drill stem 6 is rotated within the casing 7, engagement of the rollers 39 with the inner circumference of the casing 7 will result in the tendency to hold the jacket 8 stationary with the casing 7, so that the jacket 8 will tend to rotate about the drill stem 6. This rotation of the jacket 8 in respect to the drill stem 6 is facilitated because of the presence of the rollers 28 which are also mounted upon the jacket 8, but which engage the outside circumference of the drill stem 6. As pointed out previously, installation or substitution of the jacket 8 upon the drill stem 6 is facilitated because of its being formed of a plurality of sections separately held together by the bolts 11 and their nuts 12.

It is to be understood that the details of the invention as herein disclosed, are subject to alteration within the spirit or scope of the appended claims.

I claim:

1. An anti-friction bearing for a column movably disposed within a casing, comprising a jacket mounted on said column for rotary movement in a plane perpendicular to the axis of said column, said jacket comprising a plurality of arcuate sections, means for fastening said sections rigidly together to present a jacket having a bore slightly greater in diameter than said column, and a plurality of rollers journalled upon said jacket and interposed between said jacket and said casing.

2. An anti-friction bearing for a column movably disposed within a casing, comprising a jacket mounted on said column for rotary movement in a plane perpendicular to the axis of said column, said jacket comprising a plurality of arcuate sections, means for fastening said sections rigidly together to present a jacket having a bore slightly greater in diameter than said column, rollers interposed between said jacket and said column, and a plurality of rollers journalled upon said jacket and interposed between said jacket and said casing.

3. An anti-friction bearing for a column movably disposed within a casing, comprising a jacket encircling said column and having therethrough a bore slightly greater in diameter than said column, said jacket also having a plurality of recesses adjacent each end thereof and opening into said bore, rollers interposed between said jacket and column within said recesses, and shiftable means restraining said jacket against movement longitudinally of said column.

4. An anti-friction bearing for a column movably disposed within a casing, comprising a jacket comprising a plurality of arcuate sections separably joined to form the jacket encircling said column and having therethrough a bore slightly greater in diameter than said column, said jacket also having a plurality of recesses adjacent each end thereof and opening into said bore, rollers interposed between said jacket and column within said recesses, and means restraining said jacket against movement longitudinally of said column.

5. An anti-friction bearing for a column movably disposed within a casing, comprising a jacket encircling said column and having therethrough a bore slightly greater in diameter than said column, said jacket also having a plurality of recesses therein opening into said bore, a pin extending across each of said recesses parallel to the bore of said jacket, a roller journalled on each of said pins and bearing against said column, and shiftable means restraining said jacket against movement longitudinally of said column.

6. An anti-friction bearing for a column movably disposed within a casing, comprising a jacket comprising a plurality of arcuate sections separably joined to form the jacket encircling said column and having therethrough a bore slightly greater in diameter than said column, said jacket also having a plurality of recesses therein opening into said bore, a pin extending across each of said recesses parallel to the bore of said jacket, a roller journalled on each of said pins and bearing against said column, and means restraining said jacket against movement longitudinally of said column.

7. An anti-friction bearing for a column movably disposed within a casing, comprising a jacket encircling said column and having therethrough a bore slightly greater in diameter than said column, said jacket also having a plurality of recesses therein opening into said bore, rollers interposed between said jacket and column within said recesses, means restraining said jacket against movement longitudinally of said column, and a plurality of rollers journalled within recesses in the outer surface of said jacket for rotation in planes perpendicular to those of said first mentioned rollers, said last mentioned rollers projecting beyond the outer surface of said jacket.

8. An anti-friction bearing for a column movably disposed within a casing, comprising a jacket comprising a plurality of arcuate sections separably joined to form the jacket encircling said column and having therethrough a bore slightly greater in diameter than said column, said jacket also having a plurality of recesses adjacent each end thereof and opening into said bore, rollers interposed between said jacket and column within said recesses, means restraining said jacket against movement longitudinally of said column, and a plurality of rollers journalled within recesses in the outer surface of said jacket for rotation in planes perpendicular to those of said first mentioned rollers, said last mentioned rollers projecting beyond the outer surface of said jacket.

9. An anti-friction bearing for a column movably disposed within a casing, comprising a jacket encircling said column and having therethrough a bore slightly greater in diameter than said column, said jacket also having a plurality of recesses adjacent each end thereof and opening into said bore, rollers interposed between said jacket and column within said recesses, means restraining said jacket against movement longitudinally of said column, ribs disposed parallel to the bore of said jacket and defining recesses therebetween in the outer surface of the jacket, pins extending thereacross, and rollers journalled upon said pins and projecting beyond the outer surface of said jacket.

10. An anti-friction bearing for a column movably disposed within a casing, comprising a jacket comprising a plurality of arcuate sections separably joined to form the jacket encircling said column and having therethrough a bore slightly greater in diameter than said column, said jacket also having a plurality of recesses adjacent each end thereof and opening into said bore, rollers interposed between said jacket and column within said recesses, means restraining said jacket against movement longitudinally of said column, ribs disposed parallel to the bore of said jacket and defining recesses therebetween in the outer surface of the jacket, pins extending thereacross, and rollers journalled upon said pins and projecting beyond the outer surface of said jacket.

In testimony whereof I have signed my name to this specification.

CLARENCE R. BAILEY.